United States Patent
Taraba et al.

(10) Patent No.: US 7,809,211 B2
(45) Date of Patent: Oct. 5, 2010

(54) IMAGE NORMALIZATION FOR COMPUTED IMAGE CONSTRUCTION

(75) Inventors: Peter Taraba, Seattle, WA (US); Giovanni Corradini, Borgonovo Val Tidone (IT); Martin Subert, Prague (CZ)

(73) Assignee: Upek, Inc., Emeryville, CA (US)

( * ) Notice: Subject to any disclaimer, the term of this patent is extended or adjusted under 35 U.S.C. 154(b) by 943 days.

(21) Appl. No.: 11/561,239

(22) Filed: Nov. 17, 2006

(65) Prior Publication Data

US 2007/0154072 A1 Jul. 5, 2007

Related U.S. Application Data

(60) Provisional application No. 60/737,791, filed on Nov. 17, 2005.

(51) Int. Cl.
G06K 9/36 (2006.01)
(52) U.S. Cl. .................. 382/276; 382/124; 382/125; 382/127; 382/243; 382/284; 382/312; 600/443; 713/186
(58) Field of Classification Search ................ None
See application file for complete search history.

(56) References Cited

U.S. PATENT DOCUMENTS

| | | | | | |
|---|---|---|---|---|---|
| 5,040,223 A | * | 8/1991 | Kamiya et al. | ............... | 382/127 |
| 5,999,662 A | * | 12/1999 | Burt et al. | ................... | 382/284 |
| 6,097,035 A | * | 8/2000 | Belongie et al. | ............ | 250/556 |
| 6,263,091 B1 | * | 7/2001 | Jain et al. | ................... | 382/125 |
| 6,289,114 B1 | | 9/2001 | Mainguet | .................... | 382/124 |
| 6,459,804 B2 | * | 10/2002 | Mainguet | .................... | 382/124 |
| 6,466,262 B1 | * | 10/2002 | Miyatake et al. | ............ | 382/284 |
| 6,748,390 B2 | | 6/2004 | Navoni et al. | ............... | 707/100 |
| 6,919,903 B2 | * | 7/2005 | Freeman et al. | ............ | 345/582 |
| 6,961,453 B2 | * | 11/2005 | Yoon et al. | .................. | 382/125 |
| 7,054,471 B2 | | 5/2006 | Tschudi | ...................... | 382/124 |
| 7,110,577 B1 | | 9/2006 | Tschudi | ...................... | 382/124 |
| 7,197,168 B2 | * | 3/2007 | Russo | ........................ | 382/125 |
| 2002/0120195 A1 | * | 8/2002 | Hossack et al. | ............ | 600/443 |
| 2003/0076986 A1 | * | 4/2003 | Yoon et al. | .................. | 382/125 |
| 2003/0161510 A1 | * | 8/2003 | Fujii | ........................... | 382/124 |
| 2004/0208349 A1 | * | 10/2004 | Ide | .............................. | 382/124 |
| 2004/0218790 A1 | * | 11/2004 | Ping Lo | ...................... | 382/124 |
| 2005/0175225 A1 | * | 8/2005 | Shinzaki | ..................... | 382/124 |
| 2005/0259852 A1 | * | 11/2005 | Russo | ........................ | 382/124 |
| 2006/0269155 A1 | * | 11/2006 | Tener et al. | ................. | 382/243 |

FOREIGN PATENT DOCUMENTS

EP 0 988 614 B1 12/1998
EP 1 304 646 B1 12/1998

* cited by examiner

*Primary Examiner*—Vu Le
*Assistant Examiner*—Tsung-Yin Tsai
(74) *Attorney, Agent, or Firm*—Jonathan A. Small

(57) ABSTRACT

Image normalization examines the pixels of two frames, most commonly sequentially obtained sub-images, and mathematically determines the displacement of those pixels from the first frame to the second based on pixel data. The pixel data is obtained from a scanning device, and may be for example grayscale value. The image may be for example that of a user's fingerprint, and the image normalization used to form a computed image of the fingerprint from a plurality of sub-images obtained from a fingerprint scanner. The computed image may be stored, compared to a reference frame or otherwise processed, for example for identifying the user.

22 Claims, 8 Drawing Sheets

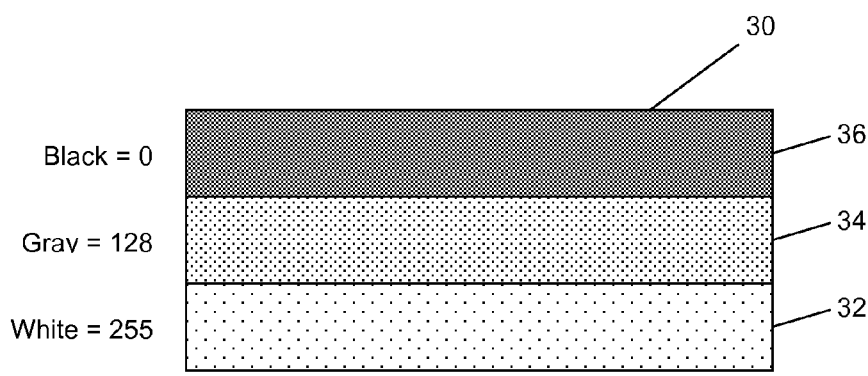
Fig. 1a
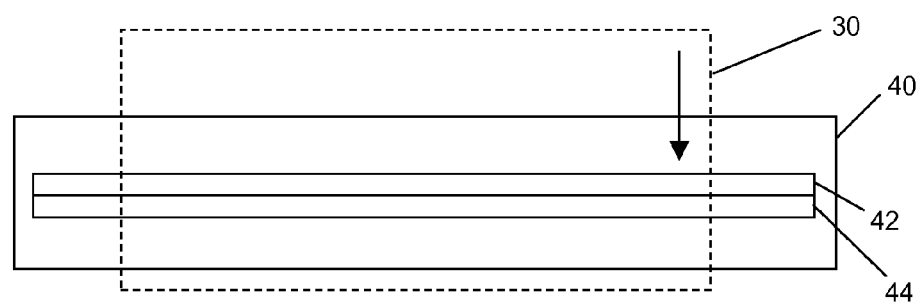
Fig. 1b
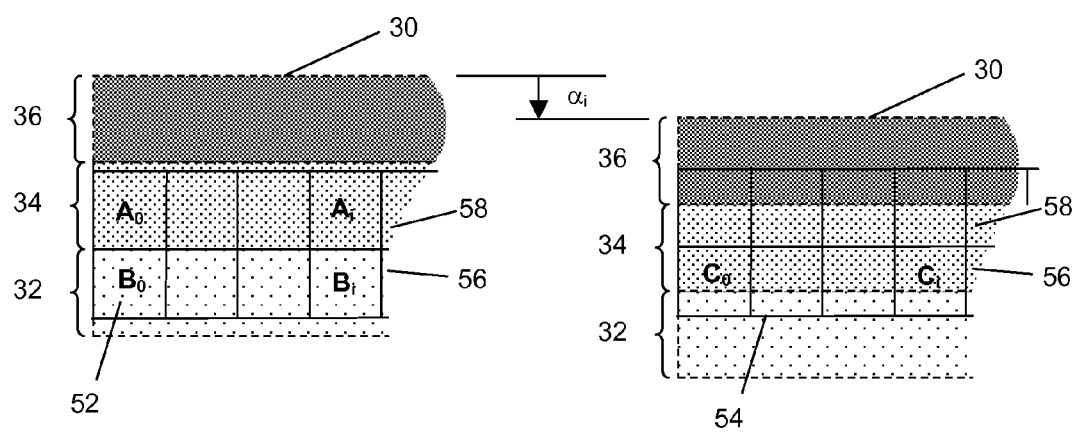
Fig. 1c
Fig. 1d

Highest correlated windows

IMAGE NORMALIZATION FOR COMPUTED IMAGE CONSTRUCTION

CROSS-REFERENCE TO RELATED APPLICATIONS

The present invention is related to and claims priority from U.S. Provisional Patent Application titled "Touchstrip Image Normalization Algorithm" filed Nov. 17, 2005, Ser. No. 60/737,791, which is incorporated herein by reference.

BACKGROUND OF THE INVENTION

1. Field of the Invention

The present invention is related to image processing, and more specifically to construction of an image from multiple sub-images, for example as may be used to compute a 2-dimensional output image from real-time sample pixel data.

2. Description of the Prior Art

In many applications it is necessary to "construct" (or "reconstruct") an image from a number of sub-images. One common example of a device employing image reconstruction is a flat bed document scanner. A document placed on a platen is scanned by a moving image capture device. Multiple strips of the document (e.g., as measured perpendicular to the document's length), between one and several pixels in height, are captured by the image capture device as it progresses along the length of the document. The relative motion between the image capture device and the document (or other item being imaged) is referred to herein as a scan, and the speed of this relative motion is referred to herein as the scan rate. Each strip is a portion of the document image referred to as a sub-image. The multiple sub-images may be "stitched" together by software to construct a 2-dimensional image of the entire document (or alternatively, the raw data may be otherwise processed).

One critical aspect of flat bed scanners is that the scan rate (relative rate of motion between scanner device and item to be scanned, regardless of which is moving) is known and/or controllable. From this, it is possible to accurately piece together the various sub-images. However, if the rate of scan is not known, or is constantly changing over time, construction of the image from the various sub-images is problematic.

There are many devices today in which the scan rate is not known or varies over time. For example, a typical strip-sensor fingerprint image capture device of the type used for biometric identification is several pixels in the scan direction, by several hundred pixels in a second, orthogonal dimension, referred to herein as the width direction. Commonly, a user slides a finger over a sensor strip in the scan direction (although the sensor may move relative to the finger in some examples). As the finger is slid over the sensor strip, images of the fingerprint are periodically captured. Multiple sub-images are thus obtained. The sub-images are subsequently mathematically assembled (or stitched) together to form a "computed" image of the fingerprint. This image can be compared with a reference image to allow or deny access to a computer, a building, etc.

However, such a device and related methods present several challenges. First, unlike the motion of the image capture device in the flat bed scanner, there is generally no synchronized control over the scan rate—the user is in complete control over the rate at which the finger is moved over the sensor. Second, unlike the document in the flat bed scanner, the user's finger moves with several degrees of freedom relative to the sensor, for example the width direction and the scan direction. Thus, a critical step in constructing an image based on data from a strip sensor fingerprint scanner, and indeed any application in which the scan rate and/or direction (in one or both dimensions) vary or are unknown, is properly ordering and positioning the sub-images so as to assemble an accurate image. (While in some image capture systems image rotation is also a degree of freedom, image rotation is beyond the scope of this disclosure.)

Efforts have been made to address the issue of relative scan rate by mechanically or mathematically determining the rate of relative motion between the sensor device and the finger (as an example of an object being scanned). However, each present problems: variations in scan rate are difficult to accommodate, mechanical systems are subject to reliability and wear issues, both mechanical and mathematical systems indiscriminately assemble sub-images together based on time and are generally low precision, mathematical systems require significant system memory and processing, etc.

One method employed to properly piece together an image from a sequence of partially overlapping sub-images which does not depend upon a knowledge of the scan rate is to determine the correlation between various sub-images (the sub-images, when stored, are also referred to as frames). In image processing, the calculated correlation between a first frame $F_1$ and a second frame $F_2$ is defined as:

$$\text{Correlation} = \frac{\left(\sum a_i b_i\right)^2}{\sum a_i^2 \sum b_i^2} \quad (1)$$

where $a_i$ is the image data of frame $F_1$
$b_i$ is the image data of frame $F_2$ The image data referred to in equation (1) typically relates to the pixel's gray scale value, intensity, luminance, color, etc.

Alternatives to Correlation (sometimes mistakenly referred to as correlation) are the Sum of Absolute Differences, defined as $\Sigma \text{abs}(a_i - b_i)$ and the Sum of Squared Differences, defined as $\Sigma(a_i - b_i)^2$.

In one example of the correlation technique, all possible cases of overlap of two successive partial images are examined for a correlation in the overlapping pixels. For example, U.S. Pat. No. 6,289,114, which is incorporated herein, teaches the capture of images of a fingerprint by a one-dimensional sensor array. Trials are performed in which all possible overlapping cases of two successive images are examined for correlation between pixels in the overlapping region of the two images. The two images are stitched together in relative position as between the two which produced the "best" correlation. A distinct disadvantage of this approach is that the number of calculations required in order to examine all possible cases of overlap is tremendous, meaning the processing is slow and labor intensive and the demands on system resources (memory, processor cycles) are high.

One known method to address the quantity of calculations required for a correlation solution is to examine only selected portions of two images in their possible overlapping states. We will assume that two frames, each representing a different portion of an image have an overlapping rectangular region. Using the method of correlation, portions of the frames, called windows, can be used to calculate how and where the two frames fit together as part of the larger image. The first window is a specific M pixel by N pixel (M×N) portion of the first frame referred to as a "master" or "reference" window. The second window is a selected M×N portion of the second frame referred to as the "slave". For each possible M×N slave window on the second frame, correlation between that M×N slave window and the reference M×N window is calculated. This produces a number of window pairs (reference and slave), each pair having a calculated correlation (that is, a measure of how "alike" the two windows are). That pair of windows with the highest correlation are considered to be fully overlapping. From a knowledge of the positions of the reference and slave windows, the image displacement between the two partially overlapping frames (the shift in the image from one frame to the next) is determined. FIG. 9 is an example of first and second frames 10, 12, with reference window 14 and a plurality of slave windows 16a, 16b, 16c (not all slave windows are illustrated). Windows 14 and 16b are found to have the highest correlation. It is then determined that the position shift between the capture of the first frame 10 and the second frame 12 is two pixels in the scan direction and zero pixels in the width direction. From this, frames 10 and 12 may be stitched together to form the reconstructed image 18 shown in FIG. 10.

As correlation provides a simple comparison between two windows, displacement estimation algorithms based on correlation operate by searching window pairs. As each pair is evaluated, the correlation is recorded. The pair with the highest correlation can then be used to represent the starting point and ending point for displacement estimation, and the position at which the second frame is properly stitched to the first frame can then be determined.

However, it will be appreciated that correlation methods have certain drawbacks. First, the process involves selecting a reference frame and analyzing a great number of slave frames. That is, even in light of the windowing technique described above, a great number of comparisons must be made before a system can be certain it has located the highest correlation. Intelligent search techniques can be used to reduce the size of the search set, but still the number of computations is quite large. Second, by construction, correlation based methods must operate on data with reference to a grid, typically where a point on the grid represents one pixel. This leads to artifacts, dropped features, and other registration problems, especially when capturing and reconstructing non-linear patterns such as fingerprint patterns. Third, the maximum achievable precision of correlation methods is directly related to the resolution of the input image. For an image of given input resolution (e.g., 500 dpi) the maximum precision obtainable is +/−1.0 pixels in the x- and y-directions. Preprocessing by discrete interpolation can be used to increase the resolution for the correlation algorithm, the post processing the stitched image to de-interpolate back to the initial image resolution. But this greatly increases the computational and memory requirements.

Accordingly, an improved method for image construction from sequential sub-images is needed in the art. The method should be computationally light weight, allow for non-linear image features, and be of improved precision (preferably independent of the image resolution).

SUMMARY OF THE INVENTION

Accordingly, the present invention is directed to systems and methods for locating one or more pixels into a desired orientation, such as within a rectangular grid, and determining pixel data for those pixels adjusted for the location of those pixels, a process referred to herein as image normalization. For example, a row of pixels, each pixel having pixel data, may be provided which are not arranged to a rectangular grid. For construction of a computed image, it is desired that the pixels be obtained which are on the rectangular grid. Accordingly, the displacement between the pixels and the grid arrangement can be calculated, and that displacement, together with the data for the pixels in their un-arranged position can be used to calculate the pixel data for pixels which are arranged in the grid.

More particularly, image normalization involves mathematically determining the relative positions (displacement) of two frames of pixel data from features of individual pixels. A plurality of sub-images are captured, each sub-image for example may be several pixels in height by several hundred pixels in width. One or more selected attributes of the pixels within the sub-images are determined. For example, the gray-scale level of the pixels may be measured in the image capture process. The attributes of a pixel in a first sub-image blend to form the attributes of a pixel in a second sub-image when the pixels of the first sub-image move less than one pixel to the form the second sub-image. A mathematical relationship (as opposed to correlation) is employed to extract a measure of the movement from the position of the first sub-image to the position of the second sub-image.

According to one aspect of the invention a method is provided for generating a computed image comprised of pixels arranged in a rectangular grid using a first image frame and second image frame following a displacement of said first image frame, said second image frame not aligned with said rectangular grid, each image frame comprising at least two rows of pixels, each pixel having measured pixel data associated therewith. The method comprises the steps of:

calculating the displacement between said first and second image frames using said pixel data from said first and second image frames;

calculating by interpolation, using at least said calculated displacement and said pixel data from said second image frame, pixel data for a third image frame aligned with said rectangular grid; and generating said computed image using said third image frame.

According to another aspect of the invention, a method for generating a computed image from a scanned image is provide, which comprises: electronically sensing a first image portion proximate to a scanning device, to thereby obtain a first scanned sub-image, the first scanned sub-image including pixel data for at least two pixels thereof; storing said first scanned sub-image as a first frame; electronically sensing a second image portion proximate to said scanning device, to thereby obtain a second scanned sub-image, the second scanned sub-image including pixel data for at least two pixels thereof; storing said second scanned sub-image as a second frame; determining the amount of movement in a first direction of said scanned image relative to said scanning device between sensing said first scanned image portion and sensing said second scanned image portion by directly calculating the amount from the pixel data for at least one pixel of said second sub-image with the pixel data for at least two pixels of said first sub-image; associating the amount of movement with pixel data for the entire second frame when said amount of movement is at least equal to a threshold distance; and using said amount of movement to locate said second frame in the computed image of said scanned image.

According to another aspect of the invention, the image moves in a single dimension (e.g., in the width or scan direction) by an amount α, the first sub-image includes a pixel having pixel data with a value of A and a second pixel having pixel data with a value of B, the second sub-image includes a pixel having pixel data with a value of C, and further wherein:

$$C = \alpha B + (1-\alpha)A.$$

According to yet another aspect of the invention, relative motion between the image and the scanning device is in two dimensions, with the movement in the first dimension being represented by $\alpha$ and movement in the second dimension being represented by $\beta$, the first sub-image includes a first pixel having pixel data with a value of A, a second pixel having pixel data with a value of B, a third pixel having pixel data with a value of C, and a fourth pixel having pixel data with a value of D, the second sub-image includes a pixel having pixel data with a value of E, and further wherein:

$$E=\alpha\beta A+\alpha(1-\beta)B+\beta(1-\alpha)C+(1-\alpha)(1-\beta)D.$$

According to still another aspect of the present invention, if the amount of movement in at least one dimension, e.g., perpendicular to the width of the scanning device, is at least equal to a preset threshold value, then adding that amount of movement to an accumulator, $\Sigma\alpha$, and then determining if $\Sigma\alpha \geq 1$.

If $\Sigma\alpha<1$, a new second fingerprint portion proximate to said array is electronically sensed, to thereby obtain a new second sub-image, the new second sub-image including pixel data for at least one pixel thereof. The new second sub-image is stored as the second frame. The amount of movement in a first direction of said fingerprint relative to said scanning device is determined by a comparison of the pixel data for at least one pixel of said new second sub-image with the pixel data for at least two pixels of said first sub-image. The process then returns to the step of adding the amount of movement to the accumulator and that step and the steps thereafter are repeated.

However, if $\Sigma\alpha \geq 1$, the value of $\Sigma\alpha$ is associated with pixel data for the entire second frame. The value of $\Sigma\alpha$ is then used to locate said second frame in a computed image of said fingerprint.

According to yet another aspect of the present invention, the elements described above are provided in an automated system for scanning an image and producing a number of sub-images, calculating the relative positions of said sub-images, and assembling the sub-images into a calculated image based on the calculated relative positions of the sub-images.

According to still another aspect of the present invention, the system and method of the present invention are employed in a fingerprint identification system. The image is of a user's fingerprint. The present invention creates a calculated image of the fingerprint which may be stored for later use, compared to a reference image to determine the identify of the user, etc.

The above is a summary of a number of the unique aspects, features, and advantages of the present invention. However, this summary is not exhaustive. Thus, these and other aspects, features, and advantages of the present invention will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings:

FIGS. 1a-1d illustrate the scanning of an image and the identification of relevant pixels following a purely vertical displacement of those pixels according to one embodiment of the present invention.

DETAILED DESCRIPTION OF THE INVENTION

Figure 2A:
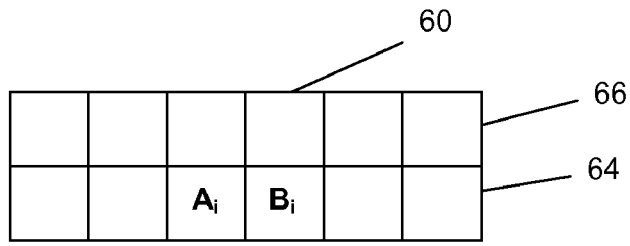
FIGS. 2a-2b illustrate the identification of relevant pixels following a purely horizontal displacement of those pixels according to an embodiment of the present invention.

Broadly stated, image normalization examines the pixels of two frames, most commonly sequentially obtained sub-images, and mathematically determines the displacement of those pixels from the first frame to the second based on pixel data. The pixel data is obtained from a scanning device, the scanning motion being physical or electronic. The data represents one or more selected attributes of the pixels from the scan. Pixel data can then be computed for a desired pixel location using the known pixel data and displacement. With the possible exception of a first line, computed pixel data (as opposed to raw image data) may then be used to construct a computed image which represents a scanned image. The concept is most readily understood with reference to a 1-dimensionally shifted example, although as will be explained in more detail, the invention is not limited to operation on displacement in a single dimension.

With reference to FIG. 1a, we will assume that an original image 30 which will be scanned comprises three rows of pixels 32, 34, 36. We will assume that these rows are the full width of the scanning device (such as a disclosed in U.S. Pat. No. 6,317,598, which is incorporated by reference herein), that the rows are oriented parallel to the width direction of the scanning device, and that each row has a different grayscale value, with row 32 having a grayscale value of 255 (defined as pure white), row 34 having a grayscale value of 128 (defined as gray), and row 36 having a grayscale value of 0 (defined as black).

Image 30 is scanned by a scanning device 40, as illustrated in FIG. 1b. That is, image 30 moves relative to scanning device 40, and in a time-wise fashion scanning device 40 captures a number of sequential sub-images. Again, it will be understood that image 30 may move relative to scanning device 40, scanning device 40 may move relative to image 30, or both image 30 and scanning device 40 may move relative to one another. It will also be noted that scanning device is capable or creating sub-images with at least two rows of pixels per scan. Thus, scanning device 40 will be comprised of at least two rows 42, 44 of image capture apparatus.

Scanning device 40 produces a plurality of frames 52, 54 during the scanning process. Frame 52, shown in FIG. 1c, comprises two rows of pixels 56, 58, with each pixel having pixel data, in this case the pixel data being a measured grayscale value (although the pixel data employed by the present invention may be another measurable attribute of the pixel, such as intensity, luminance, color, etc.) We will refer to frame 52 as a reference frame. (Image 30 is shown superimposed over frame 52 for illustration purposes only.) We will assume for explanation purposes that, given the definition of image 30 above, all pixels in row 56 have a grayscale value of 255 (white) and all pixels in row 58 have a grayscale value of 128 (gray), although the general process of image normalization described herein encompasses any state of the pixels in these rows. Frame 54, shown in FIG. 1d is acquired at some time after the acquisition of frame 52, and after image 30 has been displaced by a distance $\alpha$ (measured as a percentage of a pixel height) in the scan direction (it is assumed that the image has undergone no displacement in the width direction). We will refer to frame 54 as a sample frame. (Image 30 is shown superimposed over frame 54 for illustration purposes only.) As will be further described below, reference frame 52 and sample frame 54 need not be immediately sequential frames.

Due to the displacement of image 30 between the acquisition of frames 52 and 54, the pixels in row 56 of frame 54 no longer have a grayscale value of 255 (white), but rather a combination of the grayscale values 255 (white) from row 32 in image 30 and 128 (gray) from row 34 in image 30. If we select and examine a pixel position from each row of reference image 52, say the pixel having pixel data A from row 58 and correspondingly the pixel having pixel data $B_i$ from row 56, we note from the above that their pixel data, in this case grayscale values, are $A_i=128$, $B_i=255$. If we examine that same pixel position from row 56 in sample image 54, the pixel with pixel data $C_i$, we note that its grayscale value is somewhere between 128 and 255 dues to the contributions of rows 32 and 34 in the scanned sub-image. If we assume that the scanning of the image can be represented (or approximated) by a linear model, that is, that the values of the pixel data is a result of integration over the whole pixel area, and that there are no gaps between the pixels, then in general, for a pixel in the i-th position in a scanned row, the relationship between these values, in terms of $\alpha_i$, the displacement of a pixel from the position having value $B_i$ to the position having value $C_i$, is given by:

$$C_i = \alpha_i B_i + (1-\alpha_i) A_i \qquad (2)$$

Equation (2) can be solved for $\alpha_i$. Thus, knowing the grayscale values $A_i$, $B_i$, and $C_i$ can provide the quantities necessary to determine the relative displace $\alpha_i$ of the pixel between the two frames.

In a more general case, we would like a single $\alpha$ which represents the vertical displacement of the frame. That is, we would like to find an $\alpha$ such that for any i, the following holds true:

$$C_i = \alpha B_i + (1-\alpha) A_i \qquad (3)$$

In an ideal case, given that motion is purely 1-dimensional, each $\alpha_i$ should have the same value. However, this may not be the case due to errors in sensing (e.g. noise), non-linearity or other error introduced by the model of sensing given by equation (2), etc. That is, each pixel location may have associated with it its own $\alpha_i$. But since we have essentially a matrix of solutions to equation 2, we can determine representative displacement $\alpha$ by one of a variety of know techniques, such as the average of the various individual displacements:

$$\alpha = \frac{1}{N} \sum_0^N \alpha_i \qquad (4)$$

Figure 2B:
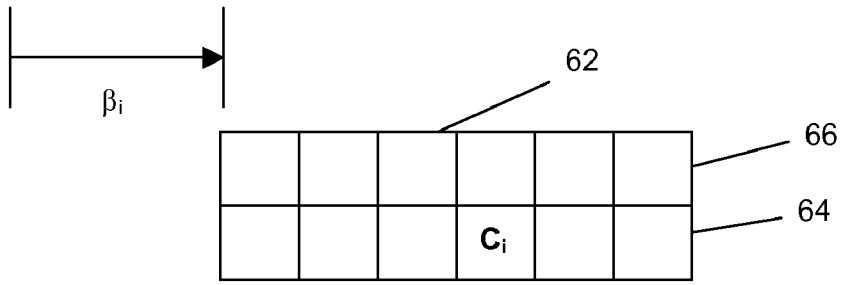

While the foregoing has assumed displacement purely in a direction perpendicular to the width of scanning device, displacement in a direction parallel to the width of the scanning device may be calculated by a similar approach. Reference frame 60, shown in FIG. 2a, comprises two rows of pixels 64, 66, with each pixel having a measured grayscale value. (Unlike the prior example, to avoid the trivial case, we assume an original image in this case with varying grayscale values across its width.) Sample frame 62, shown in FIG. 2b is acquired at some time after the acquisition of frame 62, and after the scanned image (not shown) has been displaced by a distance $\beta$ (measured as a percentage of a pixel width) parallel to the width of the scanning device. Again, reference frame 60 and sample frame 62 need not be immediately sequential frames.

Due to the displacement of the scanned image between the acquisition of frames 60 and 62, the pixels will change grayscale values. As above, the grayscale values of those pixels are related to the grayscale value for a corresponding sensor position in sample frame 62, say corresponding to $C_i$, in terms of the displacement $\beta_i$ by:

$$C_i = \beta_i B_i + (1-\beta_i) A_i \qquad (5)$$

Equation (5) can be solved for $\beta_i$ given the grayscale values $A_i$, $B_i$, and $C_i$ of their respective pixels. We can then determine the representative displacement $\beta$ by one of many mathematical methods, such as the average of the various individual displacements:

$$\beta = \frac{1}{N} \sum_0^N \beta_i \qquad (6)$$

Figure 3A:
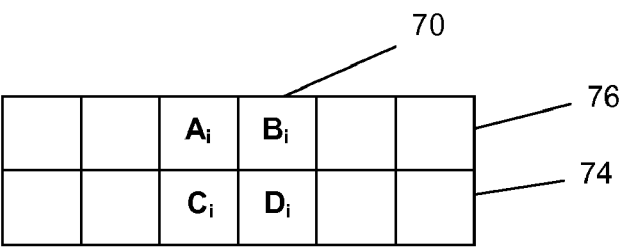
FIGS. 3a-3b illustrate the identification of relevant pixels following a mix of horizontal and vertical displacement of those pixels according to an embodiment of the present invention.
Figure 3B:
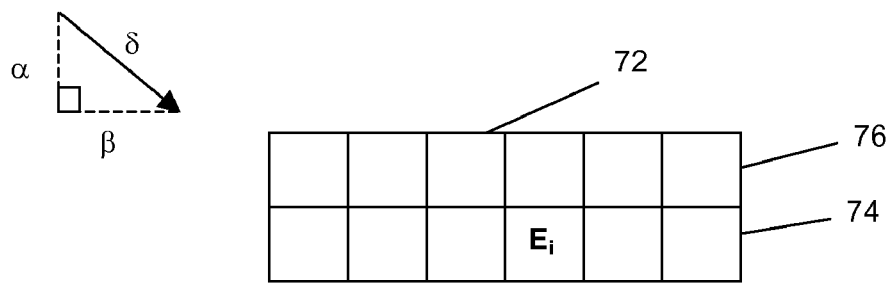

Finally, in the most generic case an image is displaced in directions both parallel to and perpendicular to the width of the scanning device, i.e., a diagonal displacement $\delta$ comprised of a displacement $\alpha$ perpendicular to the scanner width and a displacement $\beta$ parallel to the scanner width, as shown in FIG. 3a. Reference frame 70, shown in FIG. 3a, comprises two rows of pixels 74, 76, with each pixel having a measured grayscale value. Four pixels in reference frame 70 are of interest in this example, each with grayscale values of $A_i$, $B_i$, $C_i$, $D_i$. (In this example we assume that grayscale values vary as between the pixels, although such is not a requirement of the present invention.) Sample frame 72, shown in FIG. 3b is acquired at some time after the acquisition of frame 72, and after the scanned image (not shown) has been displaced by the distance $\delta$. Again, reference frame 70 and sample frame 72 need not be immediately sequential frames.

Due to the displacement of the scanned image between the acquisition of frames 70 and 72, the pixels will undergo a change in grayscale values. It can be shown that the grayscale values of those pixels are related to the grayscale value for the sensor position in sample frame 72, $E_i$, by:

$$E_i = \alpha\beta A_i + \alpha(1-\beta) B_i + \beta(1-\alpha) C_i + (1-\alpha)(1-\beta) D_i \qquad (7)$$

As α and β represent two unknowns in equation (7), there are a number of known techniques which can be used to solve therefor. For example, a converging iterative approach, a matrix solution, etc. may be employed for such a system.

Figure 4A:
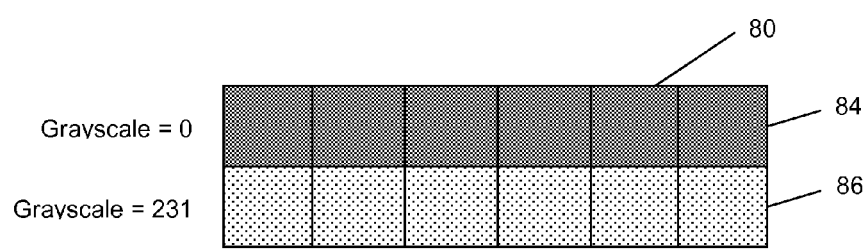
FIGS. 4a-4b illustrate a reference frame and a sample frame, obtained by scanning an image, which may be employed by an embodiment of the present invention.
Figure 4B:
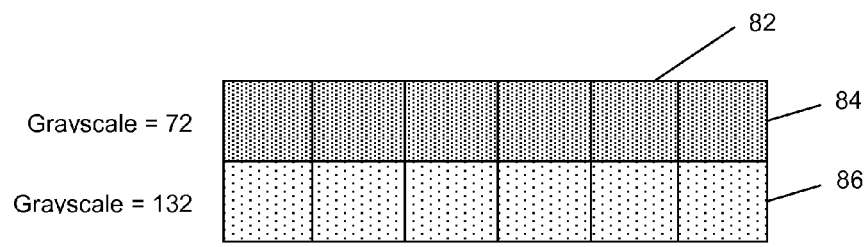

With reference to FIG. 4, the following one-dimensional example will assist in an understanding of the above description. We will assume that the target image is a fingerprint of a user. The scanning device employed consists of two rows of sensors, capable of scanning portions of the user's fingerprint. The frames produced are grayscale images where smaller grayscale values (i.e., closer to black) represent smaller distances between the user's finger and the scanner surface (e.g., a "ridge" portion of the fingerprint is closer to the scanner surface than a "valley" portion of the fingerprint, and hence the ridge has a lower grayscale value). Two frames are obtained in the scanning process, a reference frame 80 and a sample frame 82. The entire first row 84 of reference frame 80 is assumed to have a grayscale value of 0 (corresponding to a fingerprint ridge completely overlaying the first row of sensors on the scanning device). The entire second row 86 will be assumed to have the arbitrary grayscale value of 231 (although in practice each pixel in both rows 84 and 86 will have grayscale values representing the proximity of portions of the user's fingerprint to the individual pixels in the sensor device).

If a displacement α of the fingerprint occurs in the direction perpendicular to the width of the scanning device, the ridge will move downward and be sensed, at least in part, by the pixels in second row 86 (if, in one extreme, the movement corresponds to a full pixel, the pixels in row 86 would take on the value of 0). We will assume that following the displacement the grayscale value for each pixel in row 84 is 72 (although not relevant to this example) and the grayscale value for each pixel in row 86 is 132.

The change in grayscale value of each pixel in row 86 following the displacement is (132−231)=−99. In the reference frame data the difference in the grayscale values between rows 84 and 86 is (231−0)=231. This means that the maximum variation possible for the pixels in row 86 between reference frame 80 and sample frame 82 can be −231 (and this value would correspond to a movement of one complete pixel). The displacement α between the reference frame and the sample frame can be computed using ratios:

$$\frac{-231}{1} = \frac{-99}{\alpha} \quad \alpha = \frac{-99}{-231} = 0.43 \text{ pixels}$$

That is, the computed movement of the fingerprint which occurred between the scan which captured the reference image and the scan which captured the sample image is 0.43 pixels. This image normalization, in contrast to the correlation method, does not operate on multiple candidate windows but on a direct calculation using an attribute of the pixels.

Figure 5:
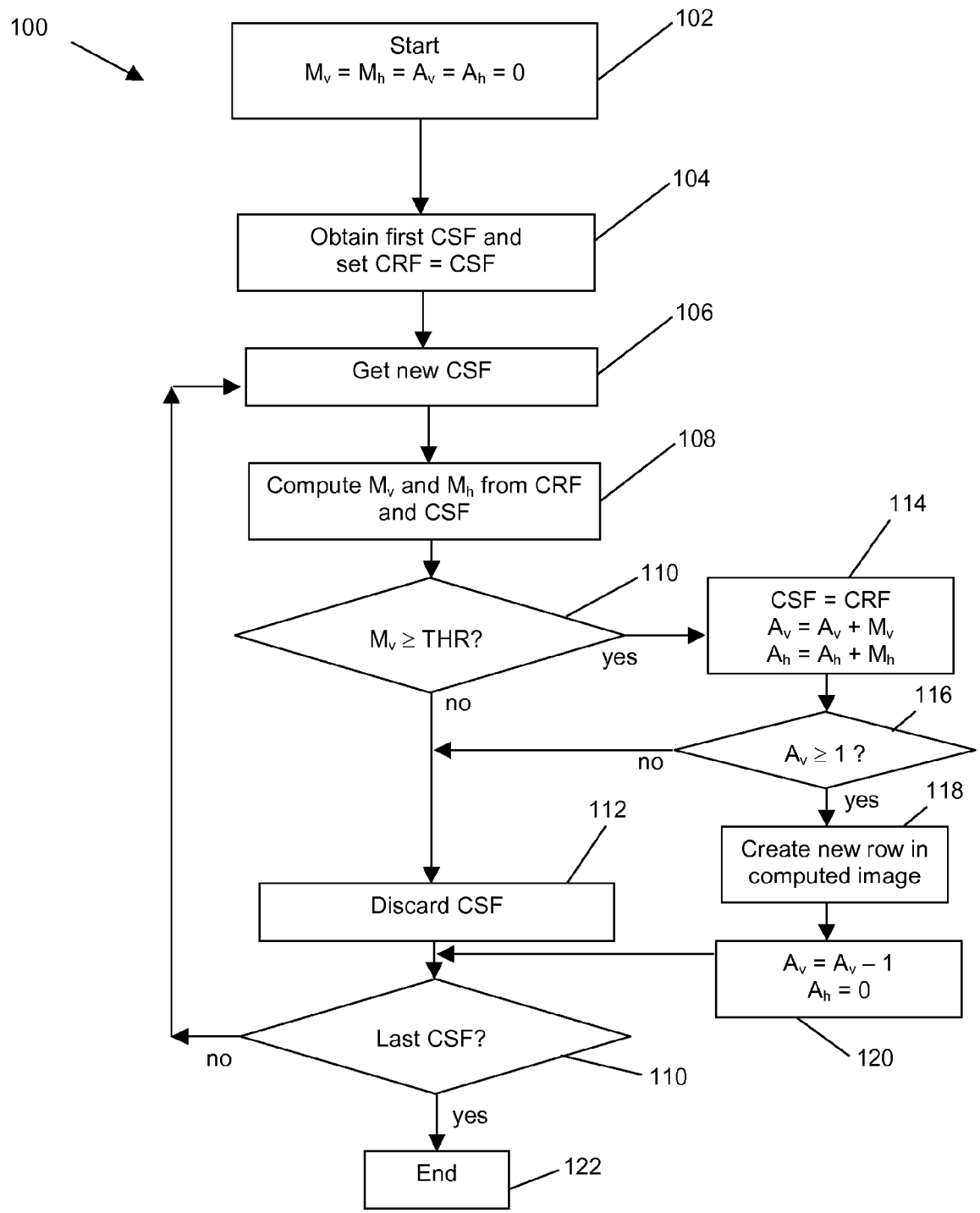
FIG. 5 illustrates the flow of a generalized implementation of image normalization according to an embodiment of the present invention.

FIG. 5 illustrates a generalized implementation 100 of image normalization according to one embodiment of the present invention. Implementation 100 begins with the establishment of the following variables:

CRF=current reference frame
CSF=candidate sample frame
$M_v$=vertical computed displacement between CRF and CSF
$M_h$=horizontal computed displacement between CRF and CSF
$A_v$=cumulative $M_v$
$A_h$=cumulative $H_h$ The initiation of the scanning of a new image begins at step 102, which sets the variables $M_v$, $M_h$, $A_v$, and $A_h$ to zero, followed by step 104, which obtains pixel data for pixels in a first frame, i.e., a sub-image. Again, a useful example of the data involved at this point is the grayscale values of the pixels in two or more scanned rows, although the present invention has broader application, such as use of other attributes of pixels (luminance, hue, saturation, etc.) Each real-time captured frame considered by the present process is considered a CSF, so technically this first frame is also called a CSF, although it is not subject to the computation and threshold steps described below. The CRF is set to be equal to this first frame pixel data.

Once the CRF is established, a new CSF is obtained at step 106. Again, this CSF will comprise data for pixels of a sub-image. No assumptions are made as to the scan directions, which may be vertical (i.e., perpendicular to scanner width), horizontal (i.e., parallel to scanner width), or a combination of the two, with regard to the orientation of the scanning device. Accordingly, the CRF and CSF are employed in the more general equation (7) above to obtain the vertical and horizontal displacements at step 108.

In order to provide an efficient data set for the reconstruction of the scanned image a limit is set on the number of frames of data that are passed to the stitching algorithm. For simplicity we assume that $M_v > M_h$ (that is, that movement is predominantly in the vertical direction as would be the case for a finger swipe). Thus, we need set a limit for vertical displacement only. It will be appreciated that the invention is not specifically so limited, as a horizontal limit may also be employed if appropriate. Accordingly, a limit is set by the vertical displacement between frames, and is represented by a threshold value THR. Accordingly, at step 110, the results of computing the $M_v$ are compared to THR. If $M_v \leq$ THR, then the CSF is discarded at step 112, and provided that the CSF is not the last CSF, the process loops back to obtaining a new CSF at step 106. If, however, $M_v \geq$ THR, then at step 114 the CSF becomes the new CRF, $A_v$ is updated so that $A_v = A_v + M_v$, and $A_h$ is updated so that $A_h = A_h + M_h$.

It is the goal to output complete rows of pixels to be reconstructed into the computed image. Thus, $A_v$ equal to 1 means that the image has shifted down 1 full pixel since the last frame was output as a row for the computed image. Accordingly, at step 116 it is determined whether $A_v \geq 1$. If not, the CSF and associated $M_v$ and $M_h$ are discarded, and provided that the CSF is not the last CSF, the process loops back to obtaining a new CSF at step 106. If so, then the current CRF becomes the Data of Interest (DI) at step 118, meaning that the displacements $A_v$ and $A_h$ are used, together with the pixel values, to create a new row in the computed image. The processing required to compute the image (e.g., stitching algorithm) may be done on-line or off-line as described further below). $A_v$ is then decreased by one (effectively resetting $A_v$), and $A_h$ is set to 0.

It is important to note that $A_v$ is not simply reset to 0. While one advantage of the present invention is that pixel displacement is not limited to a grid as with prior art methods, if not accounted for, the cumulative displacement error will iteratively contribute to significant error in the computed image. Accordingly, the displacement error can be accounted for in the next frame by carrying any $A_v$ over 1 into the next $A_v$. Thus, 1 (pixel) is subtracted from the prior $A_v$ to obtain the initial starting point for the next $A_v$ as opposed to simply resetting $A_v$ to 0. Finally, the image computation loops back to step 106 to obtain a new CSF, up to the last CSF for the captured image.

Figure 6:
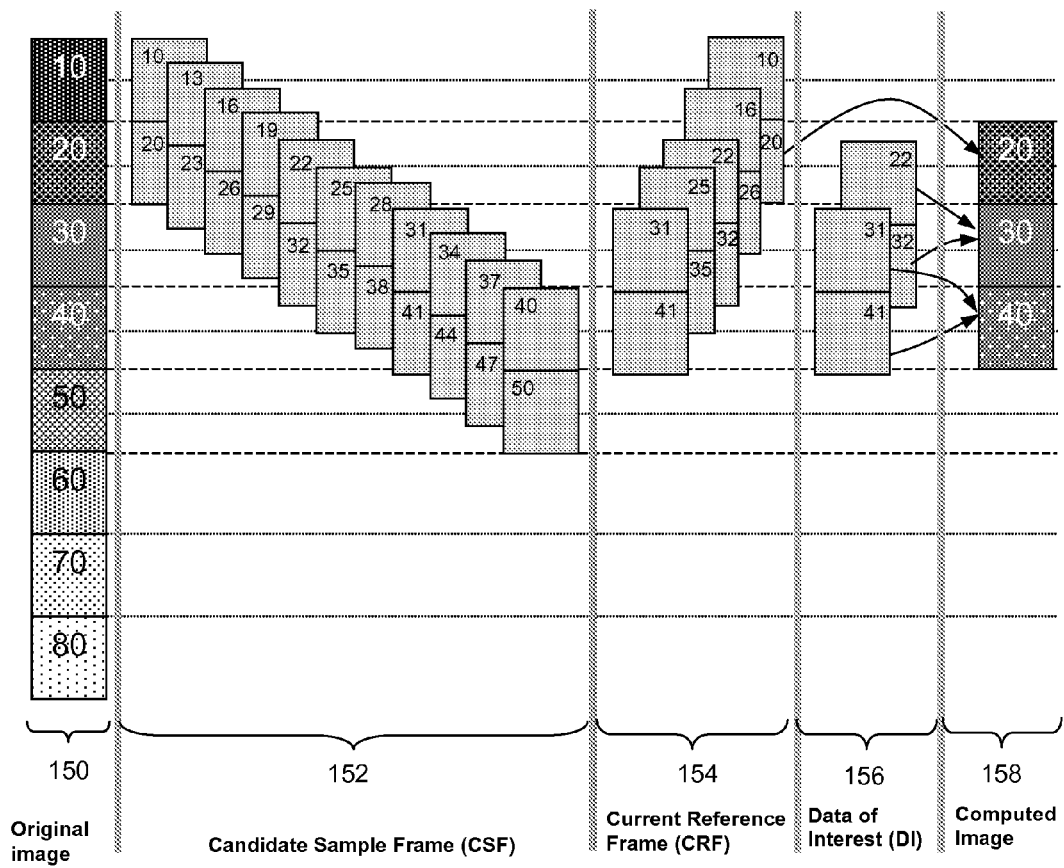
FIG. 6. is an illustration of the elements, including an original image, a reference frame, a sample frame, data of interest, and a computed image, being processed according to an embodiment of the present invention.

FIG. 6 is a graphical illustration of the processing of a scanned image and the creation of a computed image therefrom according to the previously described embodiment of the present invention. In the simulation illustrated in FIG. 6, THR has been set to 0.5 pixels, the vertical frame displacement rate is a constant 0.3 pixels/frame, and the horizontal frame displacement rate is 0 pixels/frame (i.e., one-dimensional, vertical-only scanning). These values are purely arbitrary, and as previously mentioned, the actual vertical and horizontal rates will in use of the present invention vary as a function of the control over the scanning process, the item being scanned, etc. It will be appreciated that the numbers in each box of FIG. 6 represent a grayscale value for the purposes of this illustration.

As shown, original image 150 ranges in grayscale from 10 to 80. A number of candidate sample frames 152 are obtained by scanning the original image. According to the description above, certain of these candidate sample frames become a current reference frame when the threshold criterion is met. When the vertical displacement is great than or equal to one, the current reference frame becomes the data of interest 156, which is used to generate the computed image 158. In this example, the data of interest consists of calculated frames of two rows which do not necessarily align with the integer pixel values of the original image. Accordingly, an appropriate technique such as linear interpolation or other re-sampling method may be employed to calculate the actual grayscale value of the pixel aligned with the original image (although other techniques such as weighted averaging, etc. may be employed to calculate the grayscale values). Noteworthy here is that fact that the use of the data of interest 156 to compute an image is done on-line, or within the scanning process. However, the alternative is also an applicable approach.

Figure 7:
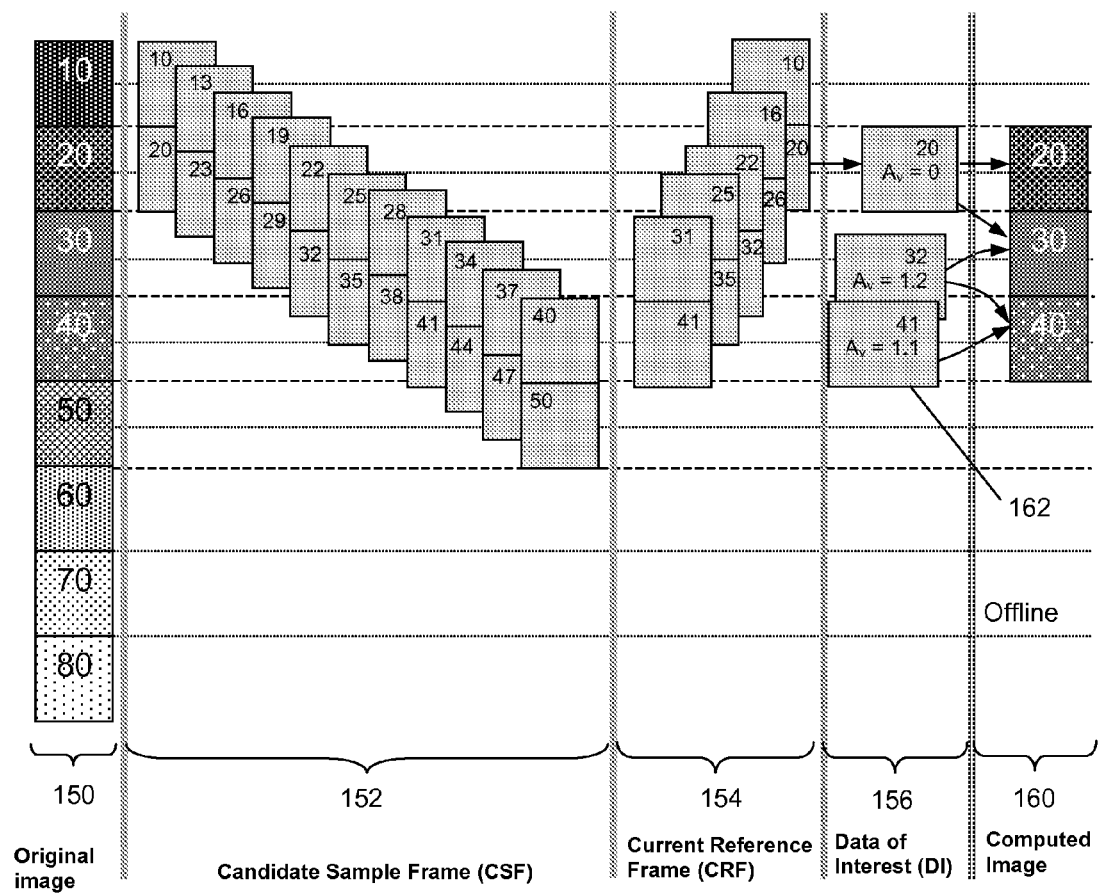
FIG. 7 is an illustration of the elements, including an original image, a reference frame, a sample frame, data of interest, and a computed image, being processed according to another embodiment of the present invention.

With reference to FIG. 7, and alternative to the above is illustrated, in which the data of interest is stored for subsequent off-line use in generating the computed image. As before, THR has been set to 0.5 pixels, the vertical frame displacement rate is a constant 0.3 pixels/frame, and the horizontal frame displacement rate is 0 pixels/frame (i.e., one-dimensional, vertical-only scanning). Also as previously described, original image 150 ranges in grayscale from 10 to 80. A number of candidate sample frames 152 are obtained by scanning the original image. According to the description above, certain of these candidate sample frames become a current reference frame when the threshold criterion is met. When the vertical displacement is great than or equal to one, the current reference frame becomes the data of interest 156. However, at this point, the data of interest 156 is stored for off-line use by the appropriate hardware and software to generate an off-line computed image 160. In this context, off-line is intended to mean that the image normalization process proceeds without the step of updating the computed image, but instead storing the data of interest for later use. The generation of the computed image can then happen non-synchronously with (e.g., following) the frame capture image normalization process. Importantly, however, the data of interest in this example is discrete pixel data values associated with displacement data. For example, pixel 162 has a grayscale value of 41 with a cumulative vertical displacement of 1.1 (meaning that it is displaced 0.1 pixels below the position of the bottom of the immediately previous pixel). Knowing the shift and the previous pixel data value allows a determination of the pixel data for the desired position, aligned with the prior pixel.

The image normalization process described above may be extended in several ways. First, the accumulated movement $A_v$ and $A_h$ have previously been considered together. However, in general it is possible to utilize their values independently in terms of their application to the construction of a computed image. In other words, it is possible to apply $A_v$ concurrently to the data stream while storing the value of $A_h$ for post-processing application and vice versa. Second, in the previous examples, the computed image relied on the current reference frame data to generate the data of interest. However, data of interest may be calculated from the relevant pixels of both the current reference frame and the candidate sample frame, weighted by the current $A_v$ and $A_h$. Third, it is natural to expect that the scan direction (e.g., direction of motion of a fingerprint) is in one direction only (i.e., α does not change sign). However, the process of the present invention is invariant to the CSF and CRF orientation and the movement detection in the opposite direction can be achieved by swapping the rows of CSF and CRF. A concurrent movement detection for both possible orientations could be done either at the beginning of the data sampling or concurrently with the scanning process. Auto-detection of movement direction or the ability to signal an error state in the event of an abrupt direction change, for example, are enabled. Finally, it is possible to detect a situation when the magnitude (rate) of the movement (horizontal or vertical) exceed a selected limit. An error state could be initiated, requiring rescanning or the like.

Figure 8A:
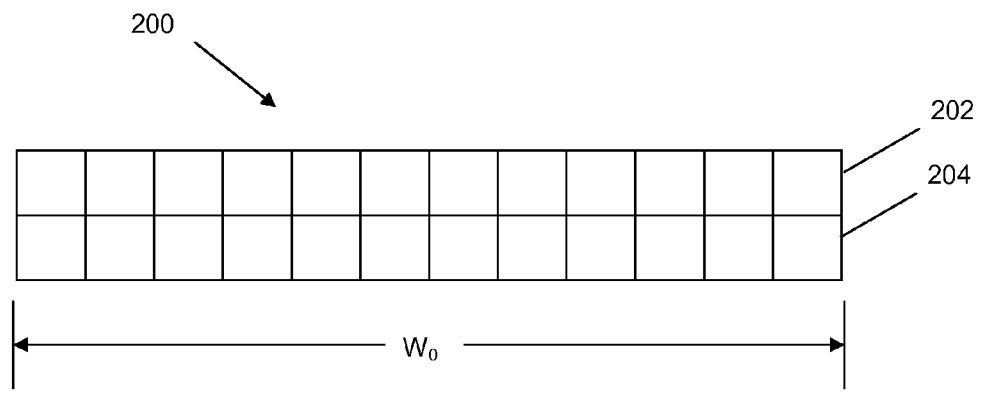
FIGS. 8a-8b are illustration of two alternate sensor embodiments which maybe employed in an embodiment of the present invention.
Figure 8B:
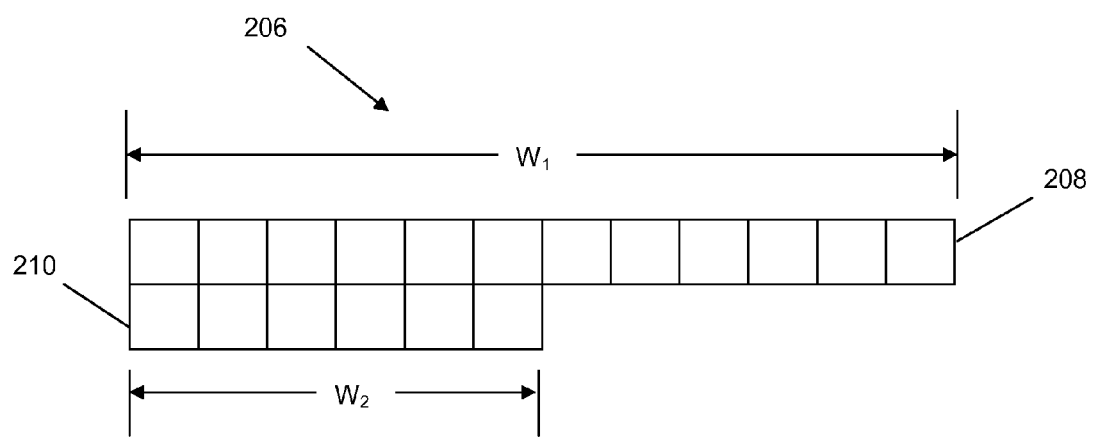
Figure 9:
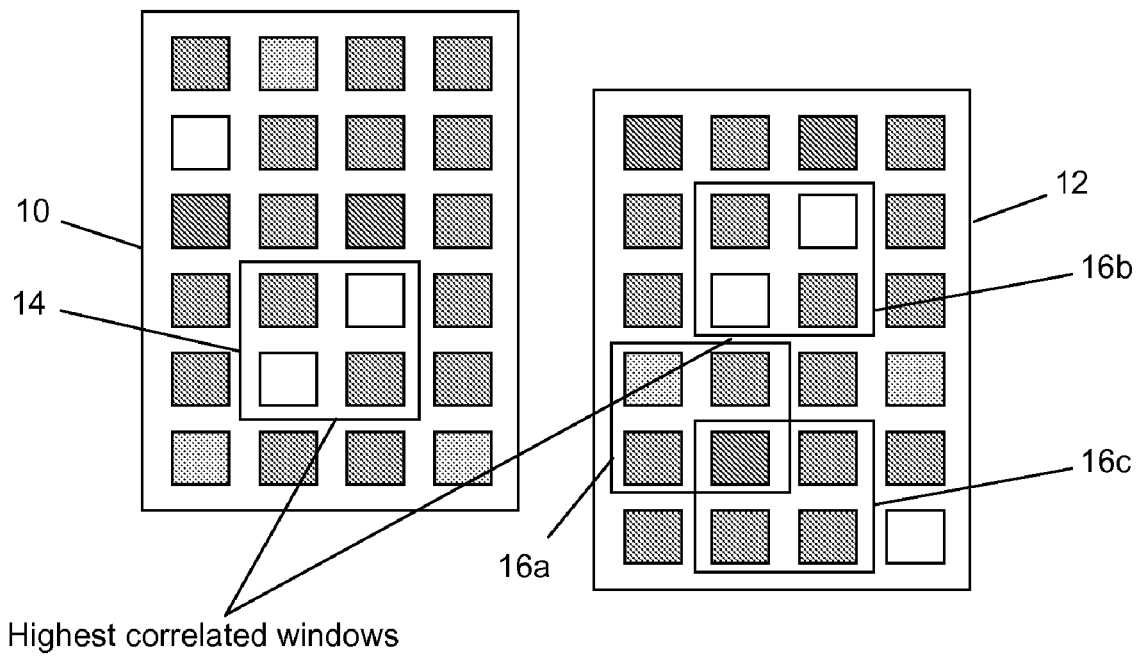
FIG. 9 is an illustration of two frames, including a reference window and a plurality of slave windows according to the prior art.
Figure 10:
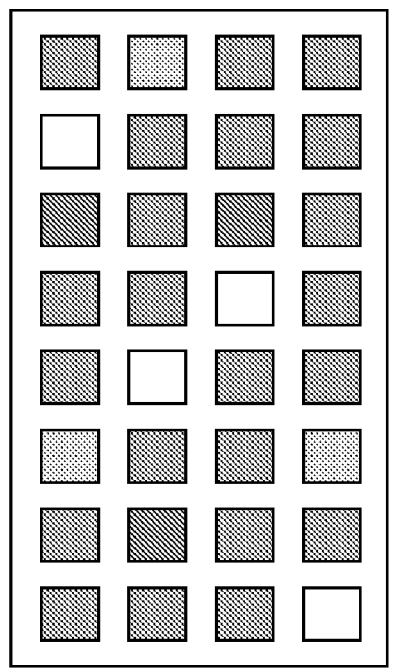
FIG. 10 is an illustration of an image formed by the method of correlation according to the prior art.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the invention in any way. For example, for ease in visualizing the present invention, in the foregoing α and β have represented displacements in the scan and width directions, respectively. However, use of these variables are not intended to signify any particular direction unless specifically referred to in an example as such. Accordingly, for example, a displacement simply referred to herein as α may represent a linear displacement in any direction (in the plane of the scanning device). In addition, a number of the examples presented herein relate to fingerprint recognition. However, a wide variety of other features, items, and images may be similarly be scanned and a computed image there of constructed. Furthermore, we have discussed orientating pixels into a rectangular grid, however other orientations may also be obtained, such as circular or elliptical, pyramidal, spherical, etc. Still further, while the foregoing has discussed sensor embodiments having two rows of pixel sensor elements, with reference to FIG. 8*a*, it will be understood that a sensor 200 may have two rows 202, 204 of like width, $w_0$, or with reference to FIG. 8*b*, a sensor 200*b* may have two rows 208, 210 of different widths $w_1$, $w_2$. Alternatively, each sensor may have two full rows, but only a portion of the second row is utilized in the image normalization process described above. Thus, the foregoing detailed description provides those of ordinary skill in the art with a convenient guide for implementation of the invention, and contemplates that various changes in the functions and arrangements of the described embodiments may be made without departing from the spirit and scope of the invention defined by the claims thereto.

What is claimed is:

1. A method for generating a computed image from a scanned image, comprising:
   electronically sensing a first image portion proximate to a scanning device, to thereby obtain a first scanned sub-image, the first scanned sub-image including pixel data for at least two pixels thereof;
   storing said first scanned sub-image as a first frame;

electronically sensing a second image portion proximate to said scanning device, to thereby obtain a second scanned sub-image, the second scanned sub-image including pixel data for at least two pixels thereof;

storing said second sub-image as a second frame;

determining the amount, α, the image moves in a first direction relative to said scanning device between sensing said first scanned image portion and sensing said second scanned image portion by directly calculating the amount from a comparison of the pixel data for at least one pixel of said second frame with the pixel data for at least two pixels of said first frame;

the first frame including a first pixel having an attribute value of A and a second pixel having an attribute value of B, the second frame including a first pixel having an attribute value of C, and further wherein:

$C=\alpha B+(1-\alpha)A;$ associating the amount of movement with pixel data for the entire second frame when said amount of movement is at least equal to a threshold distance;

using said amount of movement and pixel data from said second frame to construct a third frame; and locating said third frame in the computed image of said scanned image.

2. The method of claim 1, wherein said at least two pixels from the first frame are contiguous.

3. The method of claim 1, wherein the image moves by an amount α in a first direction which is significantly greater than the amount the image moves in a second direction, the first and second directions being orthogonal.

4. The method of claim 3, wherein the scanned image is captured by a scanning device having a width direction, and wherein said first direction is perpendicular to said width direction.

5. The method of claim 3 wherein the step of constructing a third frame comprises:

determining the pixel data value for pixels comprising said third frame.

6. The method of claim 3, wherein said step of determining the pixel data value comprises determining said pixel data value by interpolation using pixel data values from said first and second frames.

7. The method of claim 1, wherein the pixel data for each pixel comprises the grayscale value of the pixel.

8. A method for generating a computed image from a scanned image of a fingerprint, comprising:

electronically sensing a first fingerprint portion proximate a scanning device, to thereby obtain a first sub-image, the first sub-image including pixel data for at least two pixels thereof;

storing said first sub-image as a first frame;

electronically sensing a second fingerprint portion proximate said scanning device, to thereby obtain a second sub-image, the second sub-image including pixel data for at least two pixels thereof;

storing said second sub-image as a second frame;

determining the amount, α, the image moves in a first direction relative to said scanning device between sensing said first fingerprint portion and sensing said second fingerprint portion by directly calculating the amount from a comparison of the pixel data for at least one pixel of said second frame with the pixel data for at least two pixels of said first frame;

the first frame including a first pixel having an attribute value of A and a second pixel having an attribute value of B, the second frame including a first pixel having an attribute value of C, and further wherein:

$C=\alpha B+(1-\alpha)A;$ associating the amount of movement with pixel data for the entire second frame when said amount of movement is at least equal to a threshold distance;

using said amount of movement and pixel data from said second frame to construct a third frame; and;

locating said third frame in the computed image of said fingerprint.

9. The method of claim 8, wherein said at least two pixels from the first frame are contiguous.

10. The method of claim 8, wherein the image moves by an amount α in a first direction which is significantly greater than the amount the image moves in a second direction, the first and second directions being orthogonal.

11. The method of claim 10, wherein the scanned image is captured by a scanning device having a width direction, and wherein said first direction is perpendicular to said width direction.

12. The method of claim 10 wherein the step of constructing a third frame comprises:

determining the pixel data value for pixels comprising said third frame.

13. The method of claim 12, wherein said step of determining the pixel data value comprises determining said pixel data value by interpolation using pixel data values from said first and second frames.

14. The method of claim 10, wherein the threshold distance is less than one pixel, further comprising the steps of:

prior to using said amount of movement to construct said third frame, if the amount of movement is at least equal to the threshold, adding that amount of movement to an accumulator, Σα;

determining if Σα≧1, and if not:

electronically sensing a new second fingerprint portion proximate to said array, to thereby obtain a new second sub-image, the new second sub-image including pixel data for at least one pixel thereof;

storing said new second sub-image as the second frame;

determining the amount of movement in a first direction of said fingerprint relative to said scanning device by direct calculation using the pixel data for at least one pixel of said new second sub-image and the pixel data for at least two pixels of said first sub-image; and returning to the step of adding the amount of movement to the accumulator and repeating that step and the steps thereafter;

and if so:

associating the value of Σα with pixel data for the entire second frame; and using the value of Σα to locate said third frame in the computed image of said fingerprint.

15. The method of claim 14 wherein the step of using said amount of movement to locate said third frame in the computed image further comprises:

determining the pixel data value of at least one pixel in said third frame.

16. The method of claim 15, wherein said step of determining the pixel data value comprises determining said pixel data value by interpolation using pixel data values from said first and second frames.

17. The method of claim 8, wherein the pixel data for each pixel comprises the grayscale value of the pixel.

18. One or more processor readable storage devices having processor readable code embodied thereon, said processor readable code for programming one or more processors to perform a fingerprint image normalization method for generating a computed image of a fingerprint from a plurality of sub-images that are each a small fraction of an overall geometry of the fingerprint, the method comprising:
- electronically sensing a first fingerprint portion proximate a scanning device, to thereby obtain a first sub-image, the first sub-image including pixel data for at least two pixels thereof;
- storing said first sub-image as a first frame;
- electronically sensing a second fingerprint portion proximate said scanning device, to thereby obtain a second sub-image, the second sub-image including pixel data for at least two pixels thereof;
- storing said second sub-image as a second frame;
- determining the amount, α, the image moves in a first direction relative to said scanning device between sensing said first fingerprint portion and sensing said second fingerprint portion by directly calculating the amount from a comparison of the pixel data for at least one pixel of said second sub-image with the pixel data for at least two pixels of said first sub-image;
- the first frame including a first pixel having an attribute value of A and a second pixel having an attribute value of B, the second frame including a first pixel having an attribute value of C, and further wherein:

$$C=\alpha B+(1-\alpha)A;$$

- associating the amount of movement with pixel data for the entire second frame when said amount of movement is at least equal to a threshold distance; and
- using said amount of movement to locate said second frame in the computed image of said fingerprint.

19. A method for generating a computed image from a scanned image of a fingerprint, comprising:
- electronically sensing a first fingerprint portion proximate to a scanning device, to thereby obtain a first sub-image, the first sub-image including pixel data for at least two pixels thereof;
- storing said first sub-image as a first frame;
- electronically sensing a second fingerprint portion proximate to said scanning device, to thereby obtain a second sub-image, the second sub-image including pixel data for at least two pixels thereof;
- storing said second sub-image as a second frame;
- determining an amount of movement of the fingerprint relative the scanning device in two orthogonal dimensions relative to one another, the movement in the first dimension being represented by α and movement in the second dimension being represented by β, by directly calculating the amount from a comparison of the pixel data for at least four pixels of the first sub-image, represented respectively by A, B, C, and D to the pixel data for the at least one pixel of said second sub-image represented by E, said comparison comprising determining α and β from:

$$E=\alpha\beta A+\alpha(1-\beta)B+\beta(1-\alpha)C+(1-\alpha)(1-\beta)D;$$

- associating the amount of movement with pixel data for the entire second frame when said amount of movement is at least equal to a threshold distance;
- using said amount of movement and pixel data from said second frame to construct a third frame; and
- locating said third frame in the computed image of said fingerprint.

20. The method of claim 19 wherein the step of constructing a third frame comprises:
- determining the pixel data value for pixels comprising said third frame.

21. The method of claim 20, wherein said step of determining the pixel data value comprises determining said pixel data value by interpolation using pixel data values from said first and second frames.

22. The method of claim 19, wherein the threshold distance is less than one pixel, further comprising the steps of:
- prior to using said amount of movement to construct said third frame, if the amount of movement is at least equal to the threshold, adding that amount of movement to an accumulator, Σα;
- determining if Σα≧1, and if not:
  - electronically sensing a new second fingerprint portion proximate to said array, to thereby obtain a new second sub-image, the new second sub-image including pixel data for at least one pixel thereof;
  - storing said new second sub-image as the second frame;
  - determining the amount of movement in a first direction of said fingerprint relative to said scanning device by direct calculation using the pixel data for at least one pixel of said new second sub-image and the pixel data for at least two pixels of said first sub-image; and
  - returning to the step of adding the amount of movement to the accumulator and repeating that step and the steps thereafter;
- and if so:
  - associating the value of Σα with pixel data for the entire second frame; and
- using the value of Σα to at least partially locate said third frame in the computed image of said fingerprint.

* * * * *